(12) United States Patent
Kossat et al.

(10) Patent No.: US 7,690,850 B2
(45) Date of Patent: Apr. 6, 2010

(54) APPARATUS FOR SPLICING OPTICAL FIBERS

(75) Inventors: Rainer Matthias Kossat, Aschau (DE); Christian Heidler, Munich (DE)

(73) Assignee: CCS Technology, Inc., Wilmington, DE (US)

( * ) Notice: Subject to any disclaimer, the term of this patent is extended or adjusted under 35 U.S.C. 154(b) by 51 days.

(21) Appl. No.: 12/221,260

(22) Filed: Aug. 1, 2008

(65) Prior Publication Data

US 2009/0080842 A1 Mar. 26, 2009

(30) Foreign Application Priority Data

Aug. 3, 2007 (DE) ........................ 20 2007 010 785

(51) Int. Cl.
*G02B 6/255* (2006.01)
*B23K 9/00* (2006.01)
*B23K 9/10* (2006.01)

(52) U.S. Cl. ................... 385/95; 385/96; 219/121.45; 219/130.01

(58) Field of Classification Search ........................ None
See application file for complete search history.

(56) References Cited

U.S. PATENT DOCUMENTS

| | | | |
|---|---|---|---|
| 4,375,026 A * | 2/1983 | Kearney ................ | 219/130.01 |
| 5,384,870 A | 1/1995 | Lieber ........................ | 385/15 |
| 5,951,735 A | 9/1999 | Ruegenberg et al. ........... | 65/377 |
| 6,203,214 B1 | 3/2001 | Wesson ........................ | 385/97 |
| 6,207,922 B1 * | 3/2001 | Dumitriu et al. ........ | 219/121.45 |
| 6,282,353 B1 * | 8/2001 | Clark ............................ | 385/99 |
| 6,676,307 B1 | 1/2004 | Yang et al. .................... | 385/96 |
| 2002/0003934 A1 | 1/2002 | Clark ............................ | 385/99 |
| 2005/0238298 A1 * | 10/2005 | Roark et al. ................... | 385/96 |

FOREIGN PATENT DOCUMENTS

| | | |
|---|---|---|
| DE | 4139152 A1 | 6/1993 |
| DE | 10122840 A1 | 11/2002 |
| EP | 0813081 A1 | 12/1997 |
| WO | WO2005/106548 A1 | 11/2005 |

* cited by examiner

*Primary Examiner*—Omar Rojas
(74) *Attorney, Agent, or Firm*—Michael E. Carroll, Jr.

(57) ABSTRACT

An apparatus for splicing optical waveguides has a memory circuit in which data items which identify a state of the apparatus for splicing the optical waveguides are stored. The memory circuit is used to store data items which identify a state of the optical waveguides to be spliced. Stored data items indicate conditions of the environment in which a splice process has been carried out. The apparatus can be used to record a plurality of data items which can be evaluated for analysis of a splice process, in particular for an analysis of a fault which has occurred during the splice process.

36 Claims, 3 Drawing Sheets

APPARATUS FOR SPLICING OPTICAL FIBERS

RELATED APPLICATIONS

This application claims priority under 35 U.S.C. 119 to an application, filed in the German Patent Office on Aug. 3, 2007 and assigned Serial No. 202007010785.4, the contents of which are incorporated herein by reference.

BACKGROUND OF THE INVENTION

1. Field of the Invention

The invention relates to an apparatus for splicing optical waveguides, wherein a splice process is carried out as a function of control parameters.

2. Technical Background

A splice apparatus is used for connecting optical waveguides. Ends of the optical waveguides to be spliced are heated in the splice apparatus and are brought into contact with one another in order to be connected to one another by a fusion process. The quality of the splice can in general be characterized by the splice loss which occurs when light is transmitted through the optical waveguides which have been spliced to one another. If excessively high splice loss occurs, the splice process must be repeated.

There are various possible reasons for high splice loss to occur. For example, components of the splice apparatus may operate incorrectly. Faults can occur in consequence while optical waveguides are being aligned and when the optical waveguides are heated. After the optical waveguides have been aligned, the optical waveguide may, for example, have an excessive offset. The optical waveguides are generally heated by generating an arc between electrodes in the splice apparatus. One possible fault cause, for example, is that the preset splice current which occurs when the arc is being ignited between the electrode tips does not match the actual splicing current. Furthermore, the electrode tips may become dirty, thus interfering with the formation of the arc. The optical waveguides are therefore heated with an incorrect temperature profile, thus interfering with the fusion process of the materials of the two optical waveguides.

Another possible reason for faults occurs if a user has operated the apparatus incorrectly in that control parameters, for example a heating time during which the optical waveguides are heated, has been set too long or too short.

In addition to incorrect settings of the splice apparatus and components of the splice apparatus being faulty, optical waveguides to be spliced may also have been inadequately prepared, so that they are not suitable for splicing. For example, the ends of the optical waveguides which are intended to be heated in the splice apparatus may have become dirty. A further possible reason for faults is splitting which has occurred at a break point at which the optical waveguides are intended to be spliced.

When faults occur more often when splicing optical waveguides, the user will in general make use of the services of a service center. A diagnosis process, whose aim is to find the cause of a fault, is often difficult, since the user cannot adequately describe the fault that has occurred or because the settings of the splice apparatus and the conditions which were present during splicing can no longer be understood by the service center.

SUMMARY

The disclosure is directed to an apparatus for splicing optical waveguides, by means of which a state of the apparatus for splicing optical waveguides can be recorded in a manner which is as exact as possible.

An apparatus for splicing optical waveguides comprises a memory circuit for storage of data. The apparatus is configured to determine a plurality of data. items during a splice process for splicing the optical waveguides, with the data items identifying an operating state of the apparatus. The apparatus is configured to combine the plurality of data items determined during the splice process to form a data record which is associated with the splice process, and to store the data record in the memory circuit. The apparatus is configured to determine a data item which identifies a change in the operating state of the apparatus during the splice process, and to add the data item which identifies the change in the operating state of the apparatus to the data record to be stored.

According to an embodiment, the apparatus is configured to determine a plurality of further data items which identify a state of the optical waveguides to be spliced. The apparatus is configured to add the plurality of further data items to the data record to be stored.

Another embodiment provides for the apparatus to be configured to determine data items which identify a position at which the apparatus is located during the splice process. The apparatus is configured to add data items which identify the position to the data record to be stored.

According to another feature, the apparatus comprises a control panel for setting up parameters, in particular for setting of a distance between the optical waveguides, a feed of the optical waveguides, a current for splicing the optical waveguides, a time during which the optical waveguides are heated for splicing, and a fiber type of the optical waveguides. The splice process is controlled as a function of the set parameters. The apparatus is configured to add the set parameters to the data record to be stored.

In another embodiment, the apparatus comprises a voltage generator circuit for generating an operating voltage for operating components of the apparatus. The voltage level of the operating voltage generated by the voltage generator circuit is determined. The apparatus is configured to add a data item which identifies the determined voltage level of the operating voltage to the data record to be stored.

In another embodiment, the apparatus comprises a voltage detector device for determining a voltage level of a voltage, and a supply connection for applying an external supply voltage. The voltage detector device determines the voltage level of the external supply voltage. The apparatus is configured to add a data item which identifies the determined voltage level of the external supply voltage to the data record to be stored.

According to a further feature, the apparatus for splicing the optical waveguides comprises a voltage detector device for determining a voltage level of a voltage, and a battery for providing a voltage level of a supply voltage. The apparatus is configured to add a data item which identifies the determined voltage level of the supply voltage provided by the battery to the data record to be stored.

According to another embodiment of the apparatus for splicing the optical waveguides, the apparatus comprises a temperature detector device for determining a temperature of a component of the apparatus. The apparatus is configured to add a data item which identifies the determined temperature to the data record to be stored.

By way of example, the apparatus may also comprise a position finding device for determining the position at which the apparatus is located during the splice process. According to another embodiment, the apparatus comprises a measuring device for determining an air pressure or an air density. The apparatus is configured to add a data item which identifies the determined air pressure or the determined air density to the data record to be stored.

According to another embodiment, the apparatus is configured to add a fault message to the data record to be stored when a component of the apparatus behaves incorrectly during operation. The apparatus can also be configured to add a data item which identifies a state of a control program for controlling the apparatus to the data record to be stored.

In another embodiment of the apparatus, the apparatus comprises an image recording device for recording an image of the optical waveguides to be spliced. The image recording device records at least one image during the splice process for splicing the optical waveguides. The apparatus is configured to add data items which identify the at least one recorded image to the data record to be stored.

According to another exemplary embodiment, the apparatus is configured to determine a break angle of one of the optical waveguides to be spliced. The apparatus is configured to add a data item which identifies the determined break angle to the data record to be stored. The apparatus can also be configured to determine an axis angle of the optical waveguides to be spliced. In this embodiment, the apparatus is configured to add a data item which identifies the determined axis angle to the data record to be stored. According to another embodiment, the apparatus is configured to determine any respective eccentricity of the optical waveguides to be spliced. The apparatus is also configured to add a data item which identifies the respectively determined eccentricity to the data record to be stored.

According to a further feature, the apparatus is configured to determine any offset of the optical waveguides to be spliced, before aligning the optical waveguides to be spliced. The apparatus is configured to add a data item which identifies the determined offset to the data record to be stored.

In a further embodiment, the apparatus is configured to add a data item which identifies a state of a shrinking oven, a state of a transmitted-light measurement station or a state of adjusting motors for moving the optical waveguides, to the data record to be stored.

The apparatus may also comprise a moveable holding device for holding one of the optical waveguides. The holding device is moved in order to align one of the optical waveguides for the splice process. The apparatus is configured to determine a movement distance over which the holding device is moved in order to align that one of the optical waveguides. The apparatus is configured to add a data item which identifies the determined movement distance to the data record to be stored.

In another embodiment, the apparatus is configured to store in the memory circuit the number of a plurality of data records which are each associated with one splice process. The apparatus is configured to delete from the memory circuit one of the data records which was stored in the memory circuit at a time before another of the data records, when the number of data records is stored in the memory circuit and a further data record must be stored.

In a further embodiment, the apparatus may comprise a connection for connecting an external memory unit, in particular a hard disk memory or a memory card, to the apparatus. The apparatus is configured to transfer the data record that is being stored in the memory circuit to the external memory unit, and to store it there.

In a further embodiment, the apparatus comprises a connection for connecting a printer to the apparatus. The apparatus is configured to output to the printer the data record that has been stored in the memory circuit. In a further embodiment, the apparatus comprises a connection for connecting a computer to the apparatus. The apparatus is configured to transfer the computer with the data record that has been stored in the memory circuit.

According to a method, a plurality of data items are determined during a splice process for splicing the optical waveguides, with the data items identifying an operating state of the apparatus. The plurality of data items determined during the splice process are combined to form a data record which is associated with the splice process. The data record is stored in the memory circuit. A data item is determined which identifies a change in the operating state of the apparatus during the splice process, and the data item which identifies the changes in the operating state of the apparatus is added to the data record to be stored.

Furthermore, it is possible to determine a plurality of further data items which identify a state of the optical waveguides to be spliced. The plurality of further data items are added to the data record to be stored. According to another embodiment, data items are determined which identify a position at which the apparatus is located during the splice process. The data items which identify the position are added to the data record to be stored.

Parameters, in particular parameters for setting the distance between the optical waveguides, a feed of the optical waveguides, a current for splicing the optical waveguides, a time during which the optical waveguides are heated for splicing, and a fiber type of the optical waveguides can be set for the apparatus. The splice process is controlled as a function of the set parameters. The set parameters are added to the data record to be stored.

In a further embodiment of the method, an operating voltage is generated in order to operate components with the apparatus. The generated voltage level of the operating voltage is determined. A data item which identifies the determined voltage level of the operating voltage is added to the data record to be stored.

In a further embodiment of the method, the voltage level of the external supply voltage is determined. A data item which identifies the determined voltage level of the external supply voltage is added to the data record to be stored. According to a further embodiment of the method, a voltage level of a supply voltage from a battery is provided. A data item which identifies the determined voltage level of the supply voltage provided by the battery is added to the data record to be stored.

It is also possible to determine a temperature of a component of the apparatus. A data item which identifies the determined temperature is added to the data record to be stored. Furthermore, an air pressure or an air density is determined. A data item which identifies the determined air pressure or the determined air density is added to the data record to be stored.

A fault message is added to the data record to be stored when a component of the apparatus behaves incorrectly during operation. Furthermore, a data item which identifies a state of a control program for controlling the apparatus can be added to the data record to be stored.

At least one image is recorded during the splice process for splicing the optical waveguides. Data items which identify the at least one recorded image are added to the data record to be stored.

According to the method, a break angle of one of the optical waveguides to be spliced is determined. A data item which identifies the determined break angle is added to the data record to be stored. Furthermore, an axis angle of the optical waveguides to be spliced can be determined. A data item which identifies the determined axis angle is added to the data record to be stored. According to another embodiment of the method, any respective eccentricity of the optical waveguides to be spliced is determined. A data item which identifies the respectively determined eccentricity is added to the data record to be stored.

Any offset of the optical waveguides to be spliced is determined before aligning the optical waveguides to be spliced. A data item which identifies the determined offset is added to the data record to be stored.

Furthermore, a data item which identifies a state of a shrinking oven, a state of a transmitted-light measurement station or a state of adjusting motors for moving the optical waveguide, can also be added to the data record to be stored. Furthermore, a movement distance through which a holding device is moved in order to align one of the optical waveguides can be determined. A data item which identifies the determined movement distance is added to the data record to be stored.

Furthermore, the number of a plurality of data records which are each associated with a splice process can be stored in the memory circuit. One of the data records which was stored in the memory circuit before one of the other data records was stored in the memory circuit is deleted from the memory circuit when the number of data records is stored in the memory circuit and a further data record must be stored.

According to a further embodiment of the method, an external memory unit, in particular a hard disk memory or a memory card, is connected to the apparatus for splicing the optical waveguides. The data record that is stored memory circuit is transferred to the external memory unit, and is stored. By way of example, a printer can also be connected to the apparatus. The data record that is stored in the memory circuit is output to the printer. Furthermore, a computer can also be connected to the apparatus. The data record that is stored in the memory circuit is transferred to the computer.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operation of the invention.

BRIEF DESCRIPTION OF THE FIGURES

The invention will be explained in more detail in the following text with reference to figures, which show exemplary embodiments of the present invention, and in which.

DETAILED DESCRIPTION OF THE PREFERRED EMBODIMENTS

Figure 1:
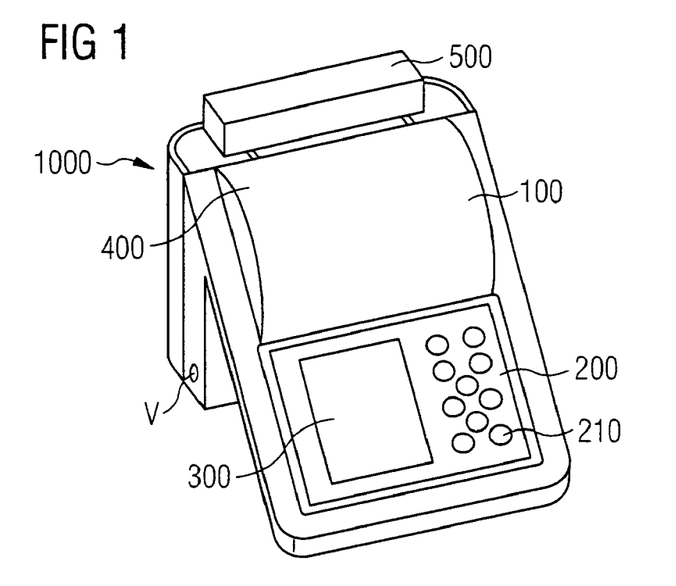
FIG. 1 is an apparatus for splicing optical waveguides.

FIG. 1 shows an apparatus 1000 for splicing optical waveguides. The illustrated embodiment of the apparatus for splicing the optical waveguides is a splice appliance which, for example, can be placed on a table. The actual splicing device 100 for splicing the optical waveguides is arranged under a cover 400. The splicing device can be controlled by a control panel 200 with control keys 210. For example, control parameters for controlling components of the splicing device are preset using the control keys 200. The set control parameters are indicated on a display device 300. Furthermore, images which have been recorded while carrying out the process of splicing optical waveguides can be visualized on the display device. In order to supply electrical power, the apparatus for splicing the optical waveguides has, for example, an external connection V to which an external supply voltage Vext can be applied. The apparatus for splicing the optical waveguides can thus be connected to an external voltage network.

Figure 2:
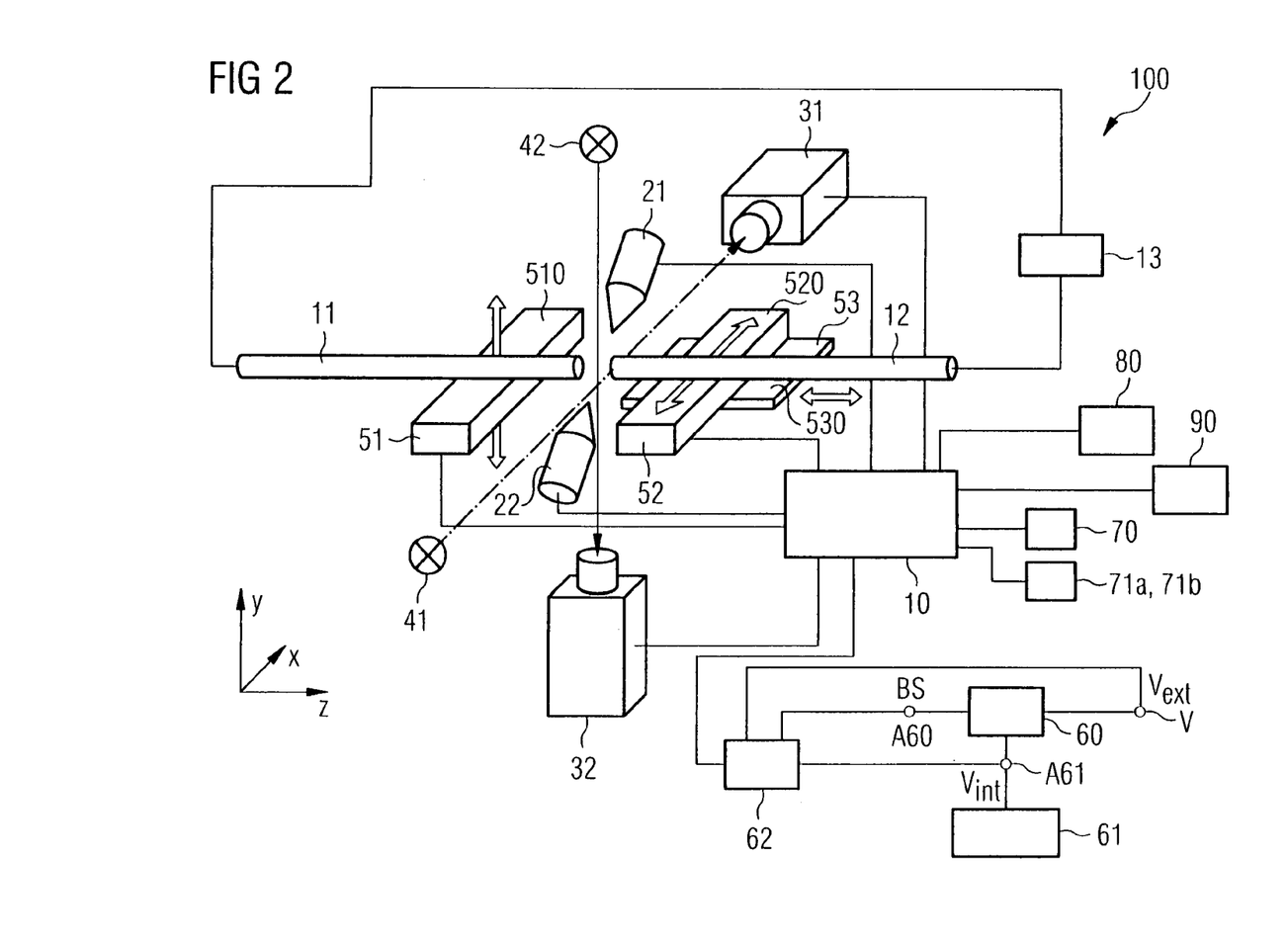
FIG. 2 depicts a splice device for an apparatus for splicing of optical waveguides having a memory circuit for storing data records which identify a splice process.

FIG. 2 shows an enlarged illustration of the splice device 100. The optical waveguides 11 and 12 to be spliced are inserted into respective holding devices 51, 52 in order to fix their ends. The two optical waveguides are aligned with respect to one another before the ends of the optical waveguides are heated. For this purpose, the holding devices are configured such that they can be moved by a motor drive. The holding devices can, for example, be moved by adjusting motors 510, 520. The optical waveguide 11, for example, is inserted into the holding device 51, which can be moved in a vertical y-direction. The optical waveguide 12 is inserted into a holding device 52 which can be moved in a horizontal x-direction. The ends of the optical waveguides can be adjusted with respect to one another, before heating, by means of the motor-driven holding devices 51 and 52.

Once the optical waveguides have been aligned, the two optical waveguides are brought into contact with one another. For this purpose, the holding device 52 is arranged on a positioning device 53 which can be moved by an adjusting motor 530. The optical waveguide 12 can be moved in this way in a z-direction, and can be moved adjacent to the optical waveguide 11.

The alignment of the optical waveguides is monitored by an image processing system. Lighting sources 41 and 42 are provided in order to record images during the alignment process and are used to illuminate the ends of the optical waveguides. Image recording devices 31 and 32 are provided in order to record images of the ends of the optical waveguides and may, for example, be in the form of cameras. The images recorded by the cameras 31 and 32 are passed to a control device 10. The control device 10 evaluates the recorded images and controls the holding device 51, 52 as well the positioning device 53 in order to align the optical waveguides, using appropriate control signals.

Electrodes 21 and 22 are provided in order to heat the ends of the optical waveguides after they have been aligned. The electrodes are controlled by the control device 10, in order to generate an arc. The ends of the optical waveguides are heated in order to fuse them, by means of the arc which is formed between the tips of the electrodes. Images of the striking of the arc, of the fusion of the ends of the optical waveguides and of the optical waveguides that have been connected to one another can likewise be recorded by the image recording devices 31 and 32.

In order to allow a fault which has occurred during splicing of optical waveguides to be understood, the apparatus for splicing the optical waveguides determines a plurality of data items which identify a state of the splice apparatus. A data record which contains these data items is stored in a memory circuit 80. For this purpose, the memory circuit 80 is connected to the control circuit 10. Furthermore, data items can be determined which identify the operating behavior of the splice apparatus. These data items are added to the data record to be stored, and are likewise stored in the memory circuit 80. Furthermore, the memory circuit 80 can be used to store data items which identify a change in a state of the apparatus for splicing the optical waveguides.

By way of example, the voltage level of the operating voltage BS with which the components of the splicing device as shown in FIG. 2, for example the motor-driven holding devices, the light sources, the image recording devices or the control circuit, are operated, is determined and is stored in the memory circuit 80. The operating voltage BS is generated by a voltage generator 60 from a voltage that is supplied, as a stabilized voltage. In order to operate the splice apparatus from the mains, the voltage generator 60 is connected to the supply voltage connection V for applying the external supply voltage Vext. The level of the external supply voltage or a level of the internal operating voltage BS generated by the voltage generator 60 is determined by a voltage detector device 62. By way of example, the determined voltage levels are passed to the control circuit 10, and stored by the control circuit 10 in the memory circuit 80.

In addition to operating the splice apparatus from an external voltage network, a battery or a rechargeable battery 61 can also be provided in order to provide an internally generated supply voltage Vint. The internally generated supply voltage Vint is supplied to the voltage generator 60 at a connection A61. The voltage generator 60 uses the supply voltage Vint provided by the battery or the rechargeable battery 61 to generate a stabilized operating voltage BS at a level which is suitable for operating the components of the splice apparatus. The voltage detector device 62 is connected to the connection 61 in order to determine a level of the supply voltage Vint which is provided by the battery 61 or the rechargeable battery 61. The supply voltage Vint determined by the voltage detector device 62 is passed to the control circuit 10, and is stored in the memory circuit 80.

The voltage levels at which the components for splicing the optical waveguides have been operated while carrying out a splice process can therefore be recorded. This allows fault causes resulting, for example, from an operating voltage which is too low or is fluctuating to be found in a simple manner.

By way of example, a system state of a shrinking oven 500 can be recorded by the control circuit 10, and can be stored in the memory circuit 80. By way of example, the state of the shrinking oven can be stored as an on/off state. If, for example if the rechargeable battery/battery state of charge is low and the shrinking oven is switched on (stored on-state of the shrinking oven), and a fault occurs while shrinking a shrink sleeve onto the splice point, the low rechargeable battery/battery state may be considered as a possible fault cause.

A further system state which is stored in the memory circuit 80 is the number of splice processes which have been carried out with the electrodes being used. The number of these splice processes is recorded by the control circuit 10, and is stored in the memory circuit 80. This makes it possible to deduce the state of the electrodes. If, for example, a large number of optical waveguides have been spliced using the same pair of electrodes, one possible cause of the occurrence of faulty splice processes may be, for example, that the electrode tip quality state is poor (dirty, deformed).

Furthermore, the control circuit records a motor position of the adjusting motors 510, 520 and 530, at which position the holding devices 51, 52 and/or the positioning device 53 are positioned before splicing, and this is stored in the memory circuit 80. By way of example, this makes it possible to determine whether splicing has been carried out at maximum positions of the motor setting, so that further alignment of the optical waveguides at these positions is no longer possible.

The control circuit can also store a data item which identifies any offset of the optical waveguides before positioning. If it is found on reading the data records stored in the memory circuit 80 that there was a large offset between the optical waveguides to be spliced before positioning of the optical waveguides, it is possible, for example, to deduce that the grooves in the holding apparatuses 51 and 52 have become dirty.

The state of the optical waveguides during or after splicing is recorded by a transmitted-light measurement station (LID-system) 13. For example, the memory circuit 80 is used to store parameters which identify the state of the transmitted-light measurement station. This includes, for example, the gain setting, which makes it possible to deduce how noisy a measurement result is, the selected transmission level, correction factors or fault states of the transmitted-light measurement stage.

In addition to the data items which identify a system state of the apparatus for splicing the optical waveguides, the memory circuit is used to store data items which identify the conditions resulting from the environment of the splice appliance, in which the optical waveguides were spliced. For this purpose, by way of example, the control device 10 is connected to a temperature detector device 70, for example to a temperature sensor, in order to detect a temperature in the housing of the splice apparatus or under the cover apparatus 100. Furthermore, the operating temperature of individual components, for example of the control circuit 10, can also be determined. The temperature detector device can also determine the environmental temperature. The determined temperature values are added to the data record determined during a splice process and are stored in the memory circuit 80.

A further important parameter which influences the quality of a splice process and/or the splice loss at the splice point of the optical waveguides to be spliced is the air pressure during a splice process. In order to determine the air pressure, a measurement device 71*a* for determining an air pressure is connected to the control circuit 10. A data item which identifies the air pressure during splicing of the optical waveguides is added by the control circuit 10 to the data record stored in the memory circuit 80.

The measuring device may also be a measuring device 71*b* for determining an air density. Once the air density has been measured, a parameter which identifies the measured air density is stored in the memory circuit 80.

Furthermore, the time at which a splice process was carried out is stored in the memory circuit 80. A position finding device 90 is provided in order to determine the point at which the splice appliance was located while carrying out a splice process. The position finding device 90 may, for example, be in the form of a positioning system based on evaluation of satellite navigation data. By way of example, the position finding device may be a GPS receiver. The position coordinates of the point where the splice process was carried out are transferred to the control circuit 10, and are stored in the memory circuit 80. By way of example, this makes it possible to find out at a later time the altitude at which the splice apparatus was located when carrying out a splice process.

In general, before splicing of optical waveguides, a user is requested by the splice apparatus to enter the altitude at which the splice apparatus is located. By comparison of the altitude details which are stored in the memory circuit 80 and have been entered by the user and the altitude actually determined by the position finding device, it is possible to subsequently find out whether a user has, for example, entered an incorrect altitude. Since splicing parameters such as the splicing current or the heating time are chosen as a function of the altitude setting, a further fault cause can be found by comparing the altitude determined by the position finding device with the altitude actually set.

By way of example, a comparison such as this can be carried out by the control circuit 10. If there is a major difference between the determined data items and the set data items, the control circuit can emit a fault message on the display device 300. The stored data items can also be analyzed by means of an analysis program. For this purpose, the stored data items are read and, for example are processed in a computer.

For example, it is possible to store the actual time during which the arc was burning, as well as the actually generated splicing current, in the memory circuit 80. In addition, the parameters set by the user via the control panel 200 are stored in the memory circuit 80. This makes it possible to determine easily at a later time whether the various components of the splicing device have actually been operated with the settings which have been entered by the user. For example, the entered separation and the actual separation between the optical waveguides to be spliced prior to the striking of the arc are stored. Furthermore, the set feed and the feed that actually took place through which the optical waveguides are moved after alignment are stored.

Further stored parameters are the fiber type entered by the user, for example single/multimode fiber type, as well as the fiber type which was determined by the fiber type identification system. By way of example, the image recording devices 31, 32 or a transmitted-light measurement station 13 may be used to carry out the fiber identification process.

Further parameters which are combined to form a data record and are stored in the memory circuit 80 relate to control parameters which characterize the splice process. These include, for example, a control parameter which defines whether the core identification is carried out by means an LID (local light injection and detection) system or by means of a CDS (core detection) system with optical core identification. The items stored also include whether a welding time control system, external contour positioning or options for dirt and angle identification were set in order to carry out a splice process. By way of example, this can be used to identify the break angle at which the splice apparatus emitted a warning.

Furthermore, data items which identify the state of components of the splicing device are added by the control circuit 10 to the data record to be stored in the memory circuit 80. By way of example, fault messages which have been generated by components of the splicing device can be added to the data record to be stored, and can be stored in the memory circuit 80. For example, fault states of the shrinking oven, of the adjusting motors and/or of the motor drivers for the adjusting motors, or a fault state of a transmitted-light measurement system (LID system) are stored. In general the splice process is controlled by means of a control program which is executed by the control circuit 10. A data item which identifies a state of the software or a state of the control program is in when a fault occurs can likewise be added to the data record to be stored. For example, a code line number or a name of a programming function during whose execution a fault has occurred can be stored in the memory circuit 10. This makes it easy to determine the point in the control program at which a faulty operating state has occurred. It is therefore possible to detect faults caused by a programming error in the control program.

In addition to data items which identify the state of the apparatus for splicing the optical waveguides, it is also possible to determine data items for a splice process which identify the state of the optical waveguides to be spliced.

Figure 3:
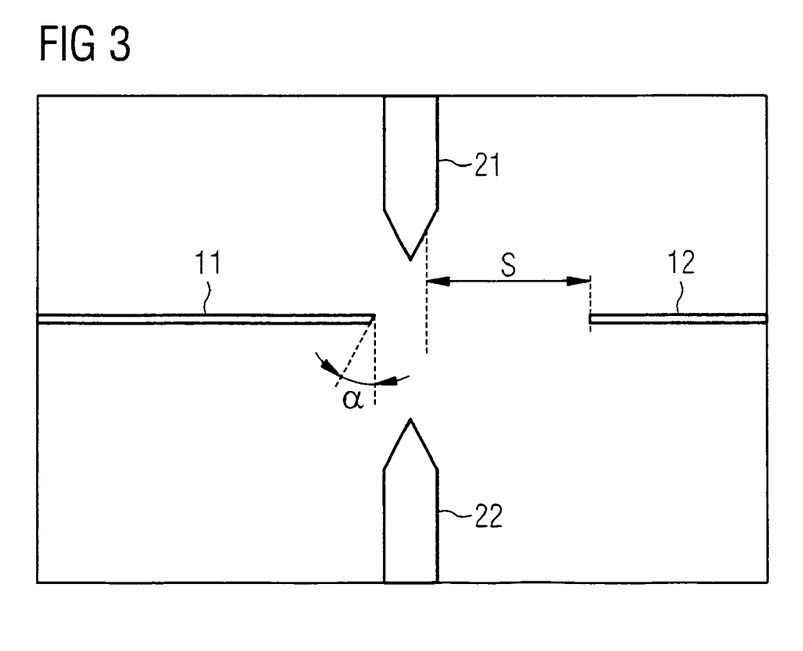
FIG. 3 depicts an image, recorded by an image recording device for the splice device, of optical waveguides to be spliced.

FIG. 3 shows an image recorded by the image recording devices 31 or 32, of the respective optical waveguides 11 and 12 to be spliced to one another. The image illustrated in FIG. 3 was recorded, for example, before the arc was struck.

The image can be subjected to image processing to determine whether the ends of the optical waveguides to be spliced were dirty or whether there was any splitting at the ends which has a negative influence on the splice process and led to the occurrence of increased splice loss. Furthermore, a break angle $\alpha$ or an axis angle, for example, can be determined on the end faces of the optical waveguides. The break angle indicates the angle at which the end surface of an optical waveguide is broken. The axis angle indicates the angle at which the longitudinal axes of the optical waveguides to be spliced intersect. Furthermore, data items which identify the eccentricity of the optical waveguides can be determined by carrying out image processing on the image recorded by the image recording devices. These data items are also added to the data record to be stored and are stored in the memory circuit 80.

In one embodiment, the recorded image can be stored in the memory circuit 80 in order to determine data items which can be obtained from the recorded image. The image data can then be evaluated when the memory circuit 80 is read, for example by an externally connected computer in which an analysis program is run.

However, the recorded images may also be evaluated directly by the control circuit 10. The data items detected from the image, for example a data item which indicates a break angle of an optical waveguide, can in this way also be stored directly in the memory circuit 80. The recorded image can also be subjected to image processing in order to determine state changes which have occurred during the splice process. For example, this makes it possible to determine a movement distance s through which the holding device 52 was moved in order to align the optical waveguides. The determined movement distance is likewise stored by the control circuit 10 in the memory circuit 80. Furthermore, the recorded image can be used to determine a state of the electrodes 21 and 22, for example, it is possible to determine whether the electrode ends were deformed or dirty. All of the data items which can be determined from the image are added by the control circuit 10 to the data record to be stored.

The recording of state data of the splice apparatus, of data items which identify environmental conditions, and of data items which indicate the state of the optical waveguides, can be carried out automatically when carrying out a new splice process. The recording of data items can also be preset manually by a user, by means of the control panel 200. For example, it is possible to create settings such that appropriate data items are determined for each splice process in which optical waveguides are spliced to one another, and to store these data items in the memory circuit 80.

For example, it is also possible to make settings such that only a specific number of data records which are each associated with one splice process are stored in the memory circuit 80, because the available memory space is limited. This makes it possible, for example, to store the data items determined during ten splice processes so that ten data records are stored in the memory circuit. Once the selected number of data records have been recorded, the data record that was stored first of all is deleted when a subsequent splice process is carried out, and is replaced with the data record of the splice process carried out most recently. Furthermore, for example, it is possible to make selections such that a data record is in each case recorded after a specific number of splice processes, for example for every tenth splice process.

Figure 4:
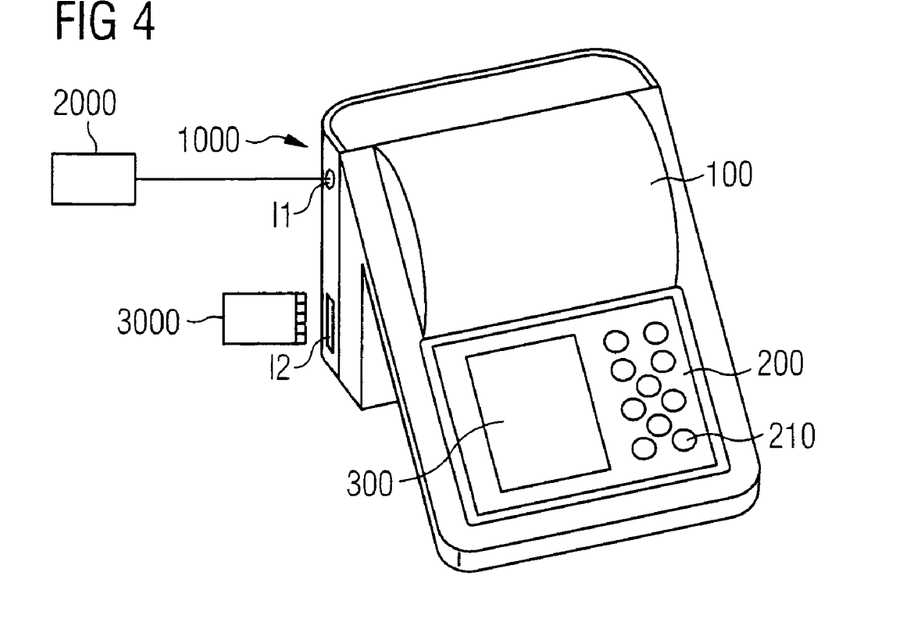
FIG. 4 depicts an apparatus for splicing optical waveguides, to which external memory units are connected.

FIG. 4 shows an embodiment of the apparatus 1000 for splicing of optical waveguides, which apparatus 1000 has a connection I1 for connecting an external memory device, and a connection I2 for connecting a further external memory device. By way of example, a hard disk 2000 can be connected to the connection I1. An external memory device 3000 is in the form of a memory stick or a memory card can be coupled to the connection I2. The connection I2 is then, for example, in the form of a slot. The connection of external memory devices makes it possible to record a greater number of data records and to use the memory circuit 80 as a buffer store whose memory content is read at specific time intervals, and is stored in one of the external memory devices.

Figure 5:
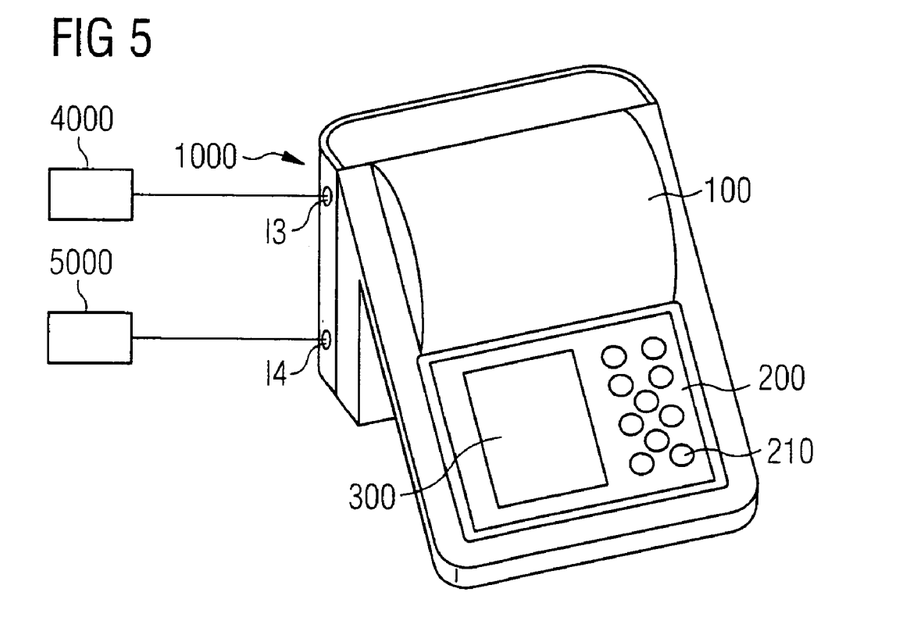
FIG. 5 depicts an apparatus for splicing optical waveguides, to which external apparatuses for outputting and for processing the stored data records are connected.

FIG. 5 shows a further embodiment 1000 of the apparatus for splicing of optical waveguides. The apparatus 1000 has a connection I3 for connecting a printer 4000. The data items from the stored data records can be output on a connected printer. Furthermore, the apparatus 1000 may also have a connection I4 by means of which the apparatus 1000 can be connected to a computer 5000. The stored data records can be transferred to the computer, and evaluated there by an analysis program. For example, this makes it possible to evaluate the images recorded by the image recording devices 31 and 32, and, for example, to determine the break angle of the fibers from the images.

Storing a plurality of data items which identify a system state, environmental influences or a state of the optical waveguides to be spliced to one another makes it possible to understand the conditions in which a splice process took place, in a simple and reliable manner. In particular, this makes it possible to assimilate a splice process for analysis purposes and to reconstruct it as accurately as possible in a service center. This allows fault causes to be found, or at least narrowed down, quickly.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. An apparatus for splicing optical waveguides, comprising:
    a memory circuit for storing data,
    the apparatus being configured to determine a plurality of data items during a splice process for splicing the optical waveguides, the data identifying an operating state of the apparatus, the apparatus being configured to determine a data item which identifies a change in the operating state of the apparatus during the splice process, and
    the apparatus being configured to combine the plurality of data items determined during the splice process, and the data item which identifies the change in the operating state of the apparatus to form a data record which is associated with the splice process, and to store the data record in the memory circuit.

2. The apparatus of claim 1, the apparatus being configured to determine a plurality of further data items which identify a state of the optical waveguides to be spliced, and
    the apparatus being configured to add the plurality of further data items to the data record to be stored.

3. The apparatus of claim 1, the apparatus being configured to determine data items which identify a position at which the apparatus is located during the splice process, and
    the apparatus being configured to add data items which identify the position to the data record to be stored.

4. The apparatus of claim 1, further comprising:
    a control panel for setting up parameters, in particular for setting of at least one of a distance between the optical waveguides, a feed of the optical waveguides, a current for splicing the optical waveguides, a time during which the optical waveguides are heated for splicing, and a fiber type of the optical waveguides,
    the splice process being controlled as a function of the set parameters, and
    the apparatus being configured to add the set parameters to the data record to be stored.

5. The apparatus of claim 1, further comprising:
    a voltage generator circuit for generating an operating voltage for operating components of the apparatus,
    the voltage level of the operating voltage, generated by the voltage generator circuit being determined, and
    the apparatus being configured to add a data item which identifies the determined voltage level of the operating voltage to the data record to be stored.

6. The apparatus of claim 1, further comprising:
    a voltage detector device for determining a voltage level of a voltage,
    a supply connection for supplying an external supply voltage,
    the voltage detector device determining the voltage level of the external supply voltage, and
    the apparatus being configured to add a data item which identifies the determined voltage level of the external supply voltage to the data record to be stored.

7. The apparatus of claim 1, further comprising:
    a voltage detector device for determining a voltage level of a voltage,
    a battery for providing a voltage level of a supply voltage,
    the apparatus being configured to add a data item which identifies the determined voltage level of the supply voltage provided by the battery to the data record to be stored.

8. The apparatus of claim 1, further comprising:
    a temperature detector device for determining a temperature of a component of the apparatus, with the apparatus being configured to add a data item which identifies the determined temperature to the data record to be stored.

9. The apparatus of claim 1, further comprising:
a position determination device for determining the position at which the apparatus is located during the splice process.

10. The apparatus of claim 1, further comprising:
a measurement device for determining an air pressure or an air density,
the apparatus being configured to add a data item which identifies the determined air pressure or the determined air density to the data record to be stored.

11. The apparatus of claim 1, the apparatus being configured to add a fault message to the data record to be stored when a component of the apparatus behaves incorrectly during operation.

12. The apparatus of claim 1, the apparatus being configured to add a data item which identifies a state of a control program for controlling the apparatus to the data record to be stored.

13. The apparatus of claim 1, further comprising:
an image recording device for recording an image of the optical waveguides to be spliced,
the image recording device recording at least one image during the splice process for splicing the optical waveguides, and
the apparatus being configured to add data items which identify the at least one recorded image to the data record to be stored.

14. The apparatus of claim 1, the apparatus being configured to determine a break angle or an axis angle or a respective eccentricity of one of the optical waveguides to be spliced, and with the apparatus being configured to add a data item which identifies the determined break angle, axis angle or the respective eccentricity to the data record to be stored.

15. The apparatus of claim 1, the apparatus being configured to determine any offset of the optical waveguides to be spliced, before aligning the optical waveguides to be spliced, and
the apparatus being configured to add a data item which identifies the determined offset to the data record to be stored.

16. The apparatus of claim 1, the apparatus being configured to add a data item which identifies a state of a shrinking oven, a state of a transmitted-light measurement station or a state of adjusting motors for moving the optical waveguides, to the data record to be stored.

17. The apparatus of claim 1, further comprising:
a moveable holding device for holding one of the optical waveguides,
the holding device being moved in order to align one of the optical waveguides for the splice process,
the apparatus being configured to determine a movement distance over which the holding device is moved in order to align that one of the optical waveguides, and
the apparatus being configured to add a data item which identifies the determined movement distance to the data record to be stored.

18. The apparatus of claim 1, the apparatus being configured to store in the memory circuit the number of a plurality of data records which are each associated with one splice process, and
the apparatus being configured to delete from the memory circuit one of the data records which was stored in the memory circuit at a time before another of the data records, when the number of data records is stored in the memory circuit and a further data record must be stored.

19. The apparatus of claim 1, further comprising:
a connection for connecting an external memory unit in particular, at least one of a hard disk memory, a memory card, a printer and a computer, to the apparatus,
the apparatus being configured to transfer the data record that has been stored in the memory circuit to the external memory unit, the printer and/or the computer.

20. A method for splicing of optical waveguides, comprising:
determining a plurality of data items during a splice process for splicing the optical waveguides, with the data identifying an operating state of an apparatus for splicing the optical waveguides, and determining a data item which identifies a change in the operating state of the apparatus for splicing the optical waveguides, during the splice process,
combining the plurality of data items determined during the splice process and the data item which identifies the changes in the operating state of the apparatus for splicing the optical waveguides, to form a data record which is associated with the splice process, and
storing the data record in a memory circuit of the apparatus for splicing the optical waveguides.

21. The method of claim 20, further comprising:
determining a plurality of further data items which identify a state of the optical waveguides to be spliced, and
adding the plurality of further data items to the data record to be stored.

22. The method of claim 20, further comprising:
determining of data items which identify a position at which the apparatus for splicing the optical waveguides is located during the splice process, and
adding the data items which identify the position to the data record to be stored.

23. The method of claim 20, further comprising:
setting of parameters on the apparatus for splicing the optical waveguides, in particular setting of at least one of a distance between the optical waveguides, a feed of the optical waveguides, a current for splicing the optical waveguides, a time during which the optical waveguides are heated for splicing, and a fiber type of the optical waveguide,
controlling the splice process as a function of the set parameters, and
adding the set parameters to the data record to be stored.

24. The method of claim 20, further comprising:
producing an operating voltage for operating components of the apparatus for splicing the optical waveguides,
determining a voltage level of the operating voltage that is generated,
adding a data item which identifies the determined voltage level of the operating voltage to the data record to be stored.

25. The method of claim 20, further comprising:
determining a voltage level of an external supply voltage of the apparatus for splicing the optical waveguides, and
adding a data item which identifies the determined voltage level of the external supply voltage to the data record to be stored.

26. The method of claim 20, further comprising:
providing a voltage level of a supply voltage of a battery, and
adding a data item which identifies the determined voltage level of the supply voltage that is provided by the battery to the data record to be stored.

27. The method of claim 20, further comprising:
determining a temperature of a component of the apparatus for splicing the optical waveguides, and
adding a data item which identifies the determined temperature to the data record to be stored.

28. The method of claim 20, further comprising:
determining an air pressure or an air density,
adding a data item which identifies the determined air pressure or the determined air density to the data record to be stored.

29. The method of claim 20, further comprising:
adding a fault message to the data record to be stored when a component of the apparatus for splicing the optical waveguides behaves incorrectly during operation.

30. The method of claim 21, further comprising:
adding a data item which identifies a state of a control program for controlling the apparatus for splicing the optical waveguide to the data record to be stored.

31. The method of claim 20, further comprising:
recording at least one image of the optical waveguides to be spliced, during the splice process, and
adding data items which identify the at least recorded image to the data record to be stored.

32. The method of claim 20, further comprising:
determining at least one of a respective break angle, axis angle, and a respective eccentricity of the optical waveguides to be spliced,
adding a data item which identifies the determined break angle, the axis angle, and the eccentricity, respectively to the data record to be stored.

33. The method of claim 20, further comprising:
determining any offset of the optical waveguides to be spliced, before aligning the optical waveguides to be spliced, and
adding a data item which identifies the determined offset to the data record to be stored.

34. The method of claim 20, further comprising:
adding a data item which identifies a state of a shrinking oven, a state of a transmitted-light measurement station or a state of adjusting motors for moving the optical waveguides, to the data record to be stored.

35. The method of claim 20, further comprising:
determining a movement distance through which holding devices of the apparatus for splicing the optical waveguides are moved in order to align one of the optical waveguides, and
adding a data item with identifies the determined movement distance to the data record to be stored.

36. The method of claim 20, further comprising:
storing the number of a plurality of data records which are each associated with one splice process in the memory circuit of the apparatus for splicing the optical waveguides,
deleting one of the data records, which was stored at a time before another of the data records were stored in the memory circuit, from the memory circuit when the number of data records is stored in the memory circuit and a further data record must be stored.

* * * * *